(12) United States Patent
Cook et al.

(10) Patent No.: US 12,436,974 B2
(45) Date of Patent: Oct. 7, 2025

(54) RESOURCE CONSERVATION BASED ON QUERY COMPLEXITY

(71) Applicant: Microsoft Technology Licensing, LLC, Redmond, WA (US)

(72) Inventors: Katherine Irene Cook, Seattle, WA (US); Hui Liu, Kenmore, WA (US); Ashutosh Devendrakumar Adhikari, Toronto (CA); Payal Bajaj, Redmond, WA (US); Bradley Moore Abrams, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/590,656

(22) Filed: Feb. 28, 2024

(65) Prior Publication Data

US 2025/0272313 A1   Aug. 28, 2025

(51) Int. Cl.
*G06F 16/28* (2019.01)
*G06F 16/2457* (2019.01)

(52) U.S. Cl.
CPC ...... *G06F 16/285* (2019.01); *G06F 16/24573* (2019.01)

(58) Field of Classification Search
CPC .......................... G06F 16/285; G06F 16/24573
See application file for complete search history.

(56) References Cited

U.S. PATENT DOCUMENTS

| | | | | |
|---|---|---|---|---|
| 8,346,701 B2* | 1/2013 | Wang | ..................... | G06F 16/334 706/46 |
| 9,881,088 B1* | 1/2018 | Leber | ..................... | G06F 16/951 |
| 10,346,542 B2* | 7/2019 | Wooters | .................. | G06F 40/35 |
| 10,567,552 B2* | 2/2020 | Allen | ..................... | H04L 67/125 |
| 10,678,828 B2* | 6/2020 | Cramer | .................. | G06N 3/045 |
| 11,204,898 B1* | 12/2021 | Waas | ..................... | G06F 16/156 |

(Continued)

FOREIGN PATENT DOCUMENTS

WO    WO-2024171179 A1 *   8/2024

OTHER PUBLICATIONS

Sakota, et al., "Fly-Swat or Cannon? Cost-Effective Language Model Choice via Meta-Modeling", In Repository of arXiv:2308.06077v3, Dec. 18, 2023, 10 Pages.

(Continued)

*Primary Examiner* — Debbie M Le

(57) ABSTRACT

Systems and methods for resource conservation based on query complexity are disclosed. An input query is received (e.g., via a chat interface) and provided to a response classifier, which is a machine-learning classifier that is trained to classify input queries with complexity scores that indicate how difficult it is likely to be for an artificial intelligence (AI) model to generate a response to the input query. If the complexity score exceeds a threshold score, the input query is provided to a first AI model (e.g., a relatively high-complexity AI model having a large number of parameters, relatively long response latencies, and/or other performance characteristics). If the complexity score does not exceed the threshold score, the input query is provided to a second AI model (e.g., a lower-complexity AI model having fewer parameters, shorter response latencies, and/or other differences in performance characteristics relative to the first AI model).

20 Claims, 9 Drawing Sheets

(56) References Cited

U.S. PATENT DOCUMENTS

| | | | |
|---|---|---|---|
| 11,294,870 B1* | 4/2022 | Waas | G06F 16/215 |
| 2016/0132771 A1* | 5/2016 | Shetty | G06Q 30/0631 |
| | | | 706/46 |
| 2019/0089655 A1* | 3/2019 | Uppala | G06F 16/3329 |
| 2022/0164713 A1* | 5/2022 | Dori-Hacohen | G06N 3/045 |
| 2023/0196199 A1* | 6/2023 | Stefani | G06F 16/90335 |
| | | | 706/14 |
| 2024/0095446 A1* | 3/2024 | Mane | G06F 40/216 |

OTHER PUBLICATIONS

The Extended European Search Report Received in European Patent Application No. 25158859.6, mailed on Jul. 8, 2025, 08 pages.

* cited by examiner

RESOURCE CONSERVATION BASED ON QUERY COMPLEXITY

BACKGROUND

Generative artificial intelligence (AI) models can be used to automatically generate responses to natural language queries by a human user (e.g., via a chat interface of a search engine or other interface). Different AI models have different performance characteristics in terms of the number of parameters, the relative quality of responses, and the amount of time, energy, computational bandwidth, and/or memory required to run the AI model, among other characteristics.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for resource conservation based on query complexity. For example, an input query received via a chat interface is classified, by a machine-learning (ML) classifier model, with a complexity score that indicates how difficult it is likely to be for an AI model to generate a response to the query. More complex input queries may benefit from the use of a higher-complexity AI model for generating a response (e.g., an AI model having a very large number of parameters), while simpler input queries may be reasonably well addressed using a lower-complexity AI model (e.g., an AI model that has fewer parameters than the higher-complexity AI model). An AI model selector uses the complexity score of the input query to select a particular AI model from a set of two or more AI models that are available for generating a response to the query. For example, if the complexity score exceeds a threshold score, the model selector selects a higher-complexity model. In some examples, the model selector also considers the capacity of and/or current load on the AI models when selecting an AI model to include load balancing features. In further examples, such classifications may be performed at multiple stages of processing and responding to a query, such as at a reasoning stage and a responding stage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

Figure 1:
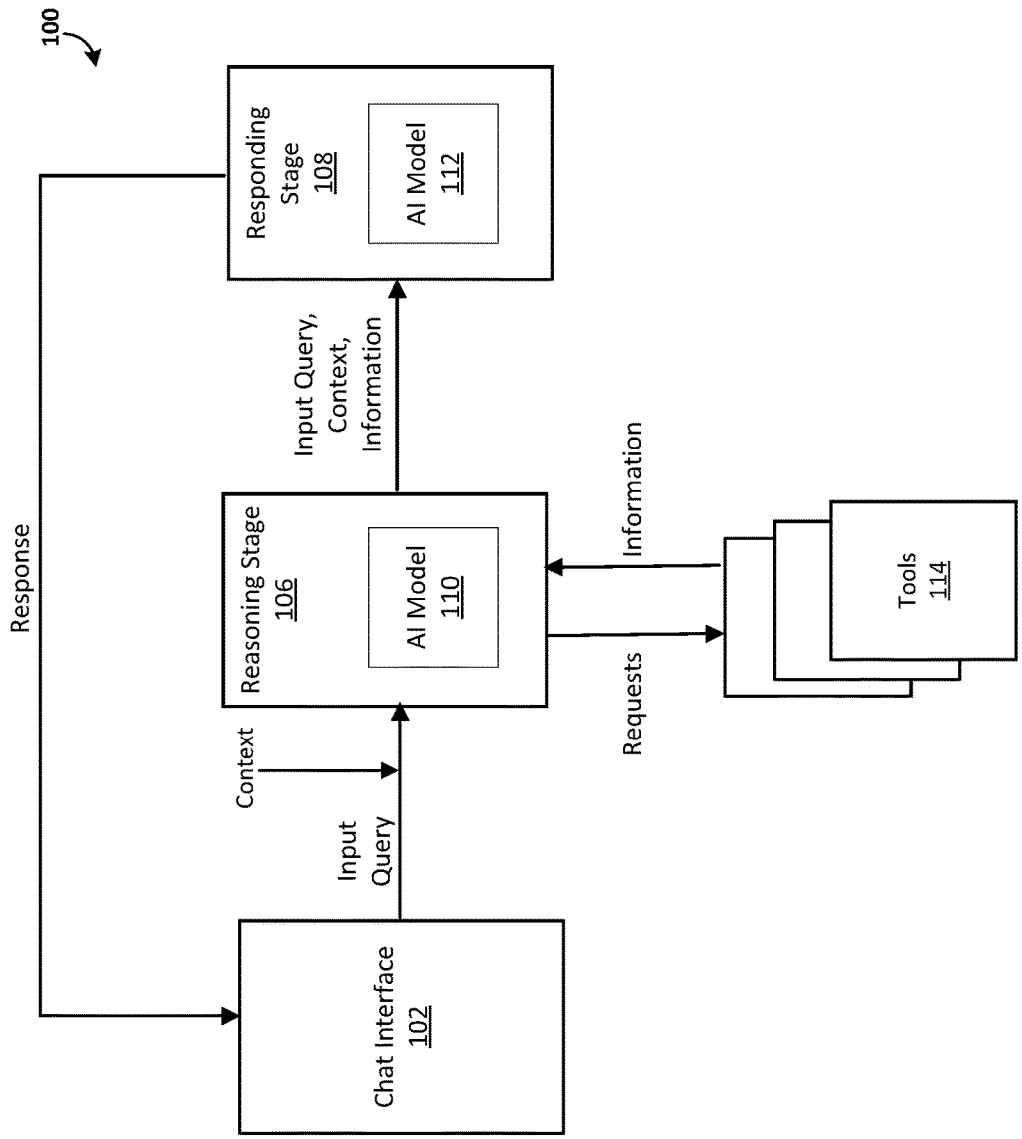
FIG. 1 is a system for resource conservation based on query complexity according to an example.

Examples described in this disclosure relate to systems and methods for selecting an AI model, such as a large language model (LLM), multimodal model, or other type of generative AI model, based on a query complexity. AI models can be used to generate responses to input queries, such as queries that are input by users in the form of natural-language input. High-complexity AI models (such as AI models that have billions of parameters) are typically capable of producing higher-quality responses over a wider range of queries relative to lower complexity AI models, but may incur longer response latencies and may be more expensive in terms of required computational bandwidth, storage, and/or energy consumption. For relatively simple input queries, a lower-complexity AI model (e.g., a model having fewer parameters than a high-complexity model) may produce acceptable responses (e.g., responses that are nearly as good as those that would be produced by a high-complexity AI model, based on various evaluation metrics) while using fewer computing resources. In some examples, a system includes (or can access) a set of two, three, or more AI models that vary in complexity, and the system routes queries to one of the AI models based on the complexity of the input query.

As described herein, a system is configured to select an AI model for generating a response to an input query based on the complexity of the input query such that more complex queries are routed to a relatively high-complexity AI model and less-complex queries are routed to a relatively low-complexity AI model. Selecting an AI model based on query complexity allows the system to minimize resource consumption associated with responding to simple queries and potentially reduce the computational loading on the higher-complexity AI model(s).

In some examples, the system uses a response classifier (e.g., a machine-learning classifier model) to classify an input query with a complexity score associated with the input query (for example, to label the input query with a complexity score). The system then selects a particular AI model from a set of two or more AI models that are accessible to the system for generating a response to the query based on the complexity score of the query. For example, if the complexity score of an input query is greater than a threshold score (indicating a relatively high complexity), the system selects a higher-complexity AI model to generate a response to the input query. Conversely, if the complexity score of an input query is lower than or equal to the threshold score (indicating a relatively low complexity), the system selects a lower-complexity AI model to generate the response.

In some examples, the threshold score is a fixed (constant) value. In other examples, the system dynamically varies the value of the threshold score based on the current utilization of the higher-complexity AI model (and/or based on the current utilization of one or more other AI models in the set), thereby providing a dynamic load-balancing feature that further factors in complexity of the queries. For example, if the higher-complexity AI model is heavily loaded, the threshold score may be increased such that more queries are directed to a lower-complexity model.

In some examples, when the system receives an input query, the system uses an AI model to identify one or more back-end tools (e.g., tools that may not be visible to the user) and/or third-party tools that should be used (e.g., invoked) to gather information that may be relevant to the query (e.g., information that an AI model can subsequently use to generate a response to the query). For example, an AI model may be used to determine, based on the input query, that one or more search queries should be transmitted to a web search tool or that other types of requests should be issued to other types of tools. This tool identification process may be referred to as "reasoning." Thus, in some cases, AI models are used at both a reasoning stage (e.g., a stage for determining which tools are relevant to the query and requesting information from the identified tools) and a responding stage (e.g., a stage for generating the response using the information gathered at the reasoning stage, if any).

The process of identifying relevant tools and formulating appropriate requests to be issued to the identified tools may be more complicated for complex input queries than for simple input queries. For example, complex input queries may require the system to obtain information from a larger number of tools (and/or the use of more complicated search queries) to generate an appropriate response. Thus, the system may use a similar query complexity classification process for selecting an AI model for the reasoning stage as is described above with respect to selecting an AI model for the responding stage.

In some examples, the system uses a reasoning classifier to determine the complexity of an input query (from the perspective of how challenging it is likely to be to identify relevant tools) and then selects an AI model for the reasoning stage based on the complexity of the input query. In some examples, the complexity score determined by the reasoning classifier may be different from the complexity score determined by the response classifier because the reasoning classifier is trained differently (e.g., using different training data) than the response classifier.

Additional details regarding resource conservation based on query complexity are discussed with reference to FIGS. 1-7.

Figure 7:
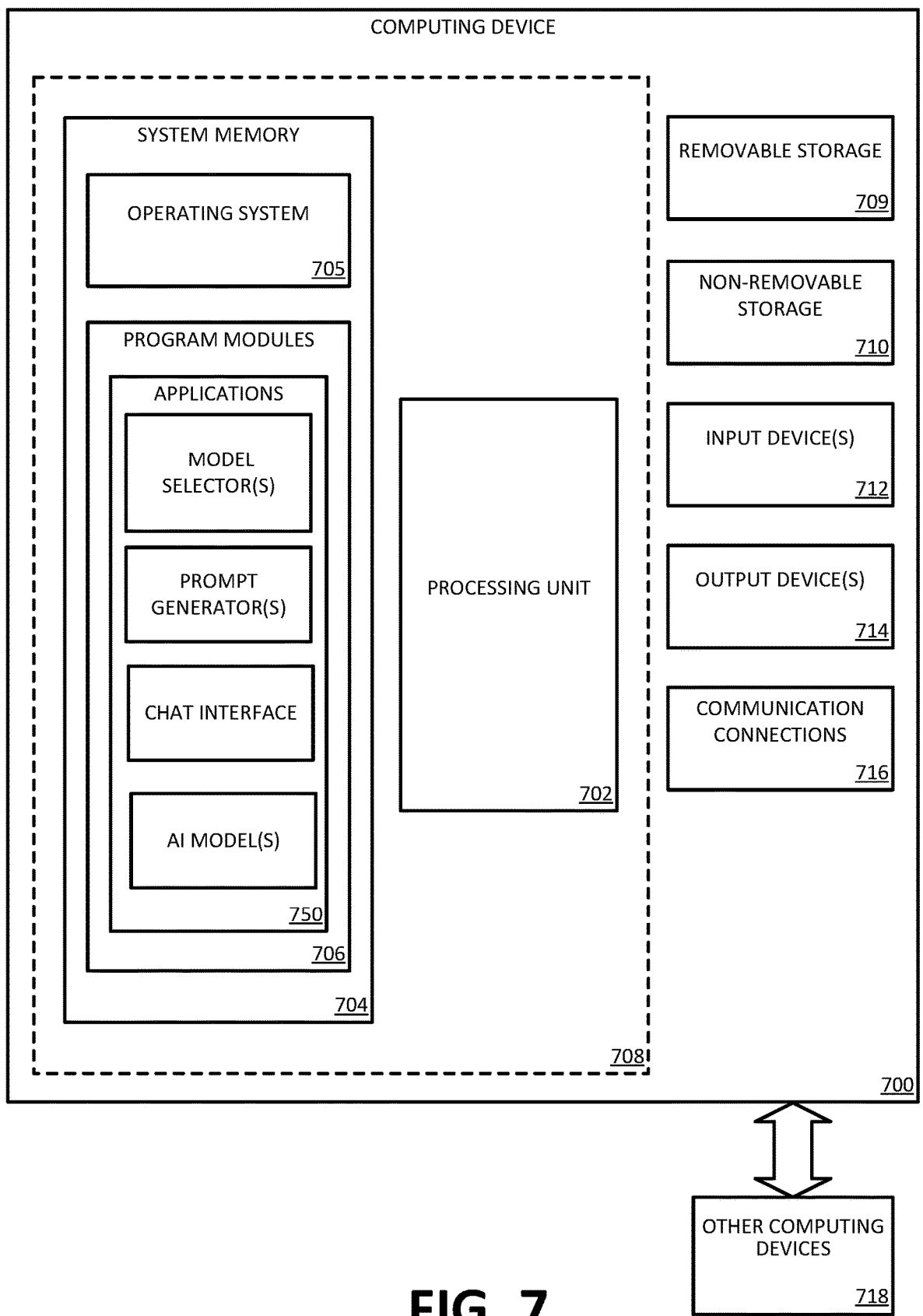
FIG. 7 is a block diagram illustrating example physical components of a computing device with which aspects of the disclosure may be practiced.

FIG. 1 is a block diagram of a system 100 for resource conservation based on query complexity in accordance with an example. The system 100, as depicted, is a combination of interdependent components that interact to form an integrated whole. Some components of the process flow are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 7. In another example, the components of systems disclosed herein are distributed across multiple processing devices. For instance, an input query may be entered on a user device or client device and information may be processed on or accessed from other devices in a network, such as one or more remote cloud devices or web server devices.

According to an aspect, the system 100 includes a chat interface 102. The chat interface 102 is a graphical user interface, a speech recognition interface, or another type of human-machine interface that is configured to receive an input query from a user and output (e.g., surface) a response to the query (e.g., by displaying the response, speaking the response, or otherwise providing the response). The input query includes a request for information, a prompt, or a question, for example. In some examples, the input query is a natural language query. The chat interface 102 is presented and/or executed by a computing device that may take a variety of forms, including, for example, a desktop computer, laptop, tablet, smart phone, wearable device, gaming device/platform, virtualized reality device/platform (e.g., virtual reality (VR), augmented reality (AR), mixed reality (MR)), etc.

The input query (and optionally, additional context such as previous queries and/or responses) are initially processed during a reasoning stage 106, in which a first AI model 110 analyzes the input query to identify which tools 114 (if any) may be relevant to the input query; e.g., which tools should be used to gather information that may be needed to generate a response to the input query. Such tools may include, for example, web search tools, image creation tools, image understanding tools, advertisement generation tools, third-party plugins, restaurant reservation tools, code generation tools, map tools, or other types of tools. If the first AI model 110 identifies one or more relevant tools, the first AI model 110 generates, based on the input query, one or more requests (e.g., search queries or other forms of requests) that are transmitted to the tools to request relevant information from the tools. The tools 114 obtain information in response to the requests. For example, if the input query includes the question "What are some birds that have blue eggs?," the first AI model 110 may determine that a web search is needed to respond to the query and formulate and send an appropriate search query to a web search tool to obtain relevant information from the web search tool.

The information (if any) gathered at the reasoning stage 106 (via the tools 114) and the input query are used during a responding stage 108 to generate a response to the input query using a second AI model 112 (which may be the same AI model as the first AI model 110 or a different AI model). The second AI model 112 is configured to generate an appropriate natural-language response to the input query, and uses the information obtained during the reasoning stage 106 (if any). For example, in response to the above example query and based on information retrieved during the reasoning stage 106, the second AI model 112 may generate a response such as "Starlings, bluebirds, and house finches all lay blue eggs." The response generated during the responding stage 108 is provided to the chat interface 102 and surfaced to the user, such as by displaying the response or audibly playing the response.

In some examples, the AI models 110, 112 each are, or include, a language model (such as an LLM) in the form of a deep neural network that utilizes transformer architectures to process the text received as an input or query. The neural network may include an input layer, multiple hidden layers, and an output layer. The hidden layers typically include attention mechanisms that allow the language model to focus on specific parts of the input text, and to generate context-aware outputs. The language model is generally trained using supervised learning based on large amounts of annotated text data.

The complexity of an AI model may be measured by the number of parameters it has. For instance, as one example of an LLM, the GPT-4 model from OpenAI has billions of parameters. These parameters may be weights in the neural network that define its behavior, and a large number of parameters allows the model to capture complex patterns in the training data. The training process typically involves updating these weights using gradient descent algorithms, and is computationally intensive, requiring large amounts of computational resources and a considerable amount of time. The language models in examples herein, however, are pre-trained, meaning that the language models have already been trained on the large amount of data. This pre-training allows the models to have a strong understanding of the structure and meaning of text, which makes them more effective for the specific tasks discussed herein.

The language model may operate as a transformer-type neural network. Such an architecture may employ an encoder-decoder structure and self-attention mechanisms to process the input data (e.g., a prompt). Initial processing of the prompt may include tokenizing the prompt into tokens that may then be mapped to a unique integer or mathematical representation. The integers or mathematical representations combined into vectors that may have a fixed size. These vectors may also be known as embeddings.

The initial layer of the transformer model receives the token embeddings. Each of the subsequent layers in the model may use a self-attention mechanism that allows the model to weigh the importance of each token in relation to every other token in the input. In other words, the self-attention mechanism may compute a score for each token pair, which signifies how much attention should be given to other tokens when encoding a particular token. These scores are then used to create a weighted combination of the input embeddings.

In some examples, each layer of the transformer model comprises two primary sub-layers: the self-attention sub-layer and a feed-forward neural network sub-layer. The self-attention mechanism mentioned above is applied first, followed by the feed-forward neural network. The feed-forward neural network may be the same for each position and apply a simple neural network to each of the attention output vectors. The output of one layer becomes the input to the next. This means that each layer incrementally builds upon the understanding and processing of the data made by the previous layers. The output of the final layer may be processed and passed through a linear layer and a softmax activation function. This outputs a probability distribution over all possible tokens in the model's vocabulary. The token(s) with the highest probability is selected as the output token(s) for the corresponding input token(s).

According to example implementations, the AI models 110, 112 are trained to understand and generate sequences of tokens, which may be in the form of natural language (e.g., human-like text). In various examples, the AI models 110, 112 can understand complex intent, cause and effect, perform language translation, semantic search classification, complex classification, text sentiment, summarization, summarization for an audience, and/or other natural language capabilities.

In example implementations, the first AI model 110, the second AI model 112, or both operate on a device located remotely from the computing device associated with the chat interface 102. For instance, the computing device may communicate with the AI models 110, 112 using one or a combination of networks (e.g., a private area network (PAN), a local area network (LAN), a wide area network (WAN)). In some examples, the language model is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

Figure 2:
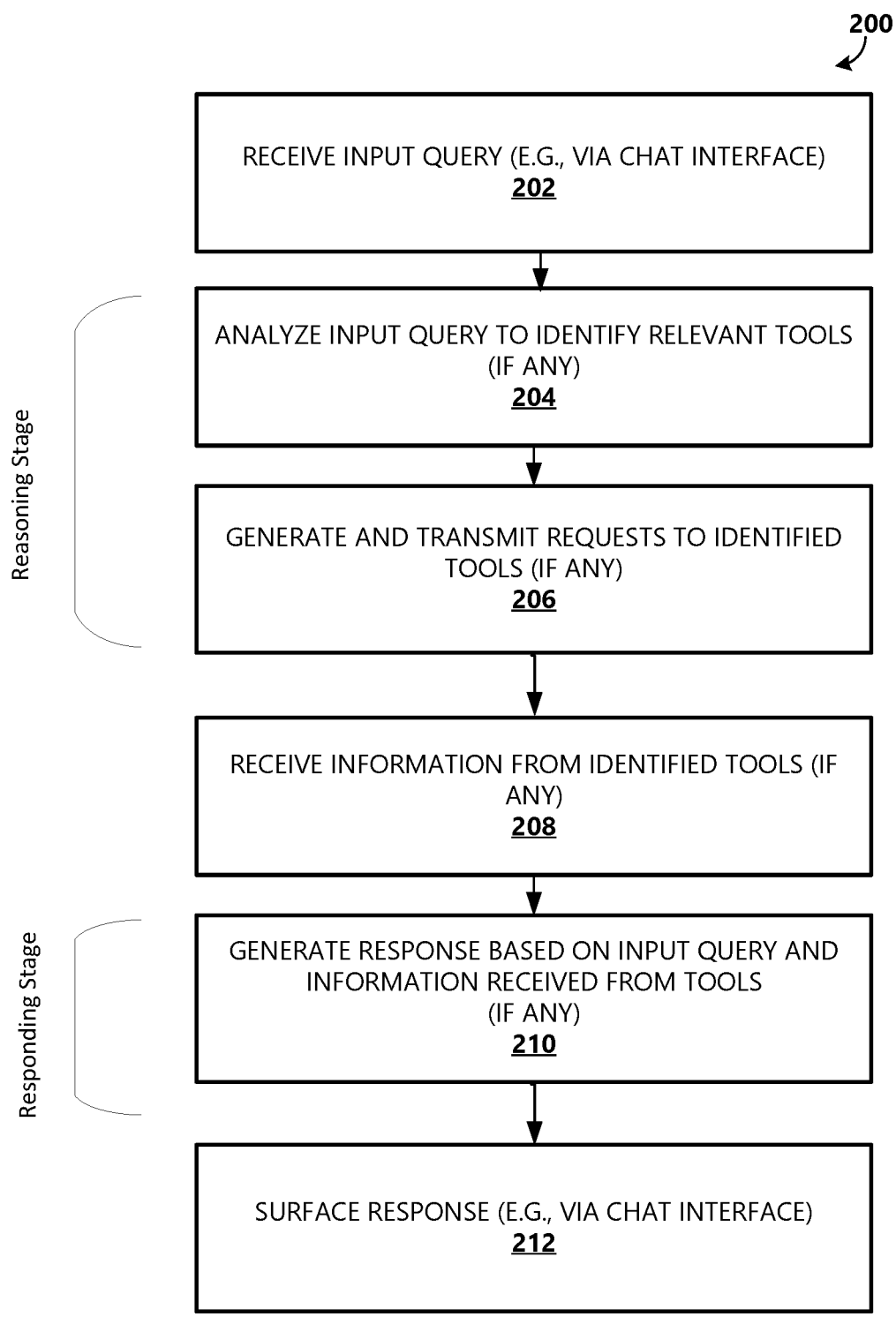
FIG. 2 depicts an example process for generating a response to an input query.

FIG. 2 depicts an example high-level process 200 that may be performed by a system to generate a response to an input query using an AI model(s). Some of the details regarding the method 200 were set forth above, and additional details regarding examples of the reasoning stage 106 and responding stage 108, along with selections of the different AI models, are discussed with reference to FIGS. 3-7.

At operation 202, an input query is received. Operations 204-206 are performed as part of the reasoning stage. At operation 204, an AI model processes the input query to determine if any backend tools should be used in generating the ultimate response to the query. For instance, the tools may be executed to generate grounding data that is incorporated into a prompt for a generative AI model to process. Differences in the AI model may generate different tool identifications and/or input information to use with such tools. At operation 206, requests for information are sent to the identified tools, and at operation 208, the requested information is returned.

The response stage then includes generating a response to the query using the information or grounding data returned from the tools (if any). For instance, at operation 210, based on the input query and the information and/or grounding data returned from the tools, an AI model generates a response to the query. The AI model used at the response stage may be the same or different from the AI model used at the reasoning stage. Similar to the reasoning stage, the type of AI model (e.g., the complexity of the AI model, such as the number of parameters) has an effect on the response that is ultimately generated. At operation 212, the generated response is surfaced to the user as a response to the query.

Figure 3:
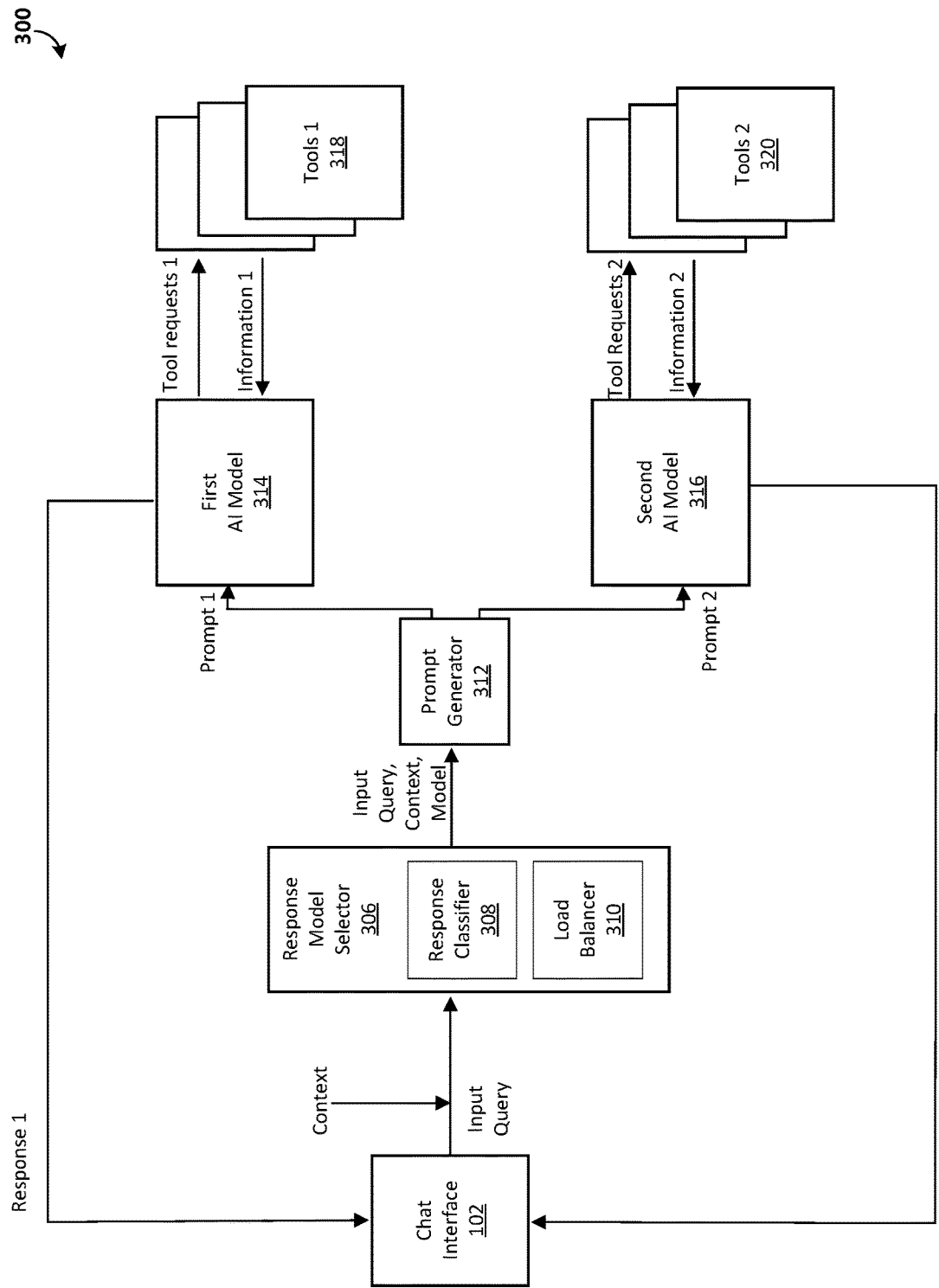
FIG. 3 is a system for resource conservation based on query complexity according to an example.

FIG. 3 represents a system 300 for resource conservation based on query complexity according to an example. System 300 includes a chat interface 302, which is an example chat interface 102, and a response model selector 306. The response model selector 306 is configured to analyze an input query received via the chat interface 302 (along with any additional relevant context, such as prior input queries in the same conversation and/or prior responses generated in response to prior input queries) to determine a complexity score associated with the input query and select, based on the complexity score, a first AI model 314 or a second AI model 316 for generating a response to the input query. In the current example, the first AI model 314 and second AI model 316 are LLM-based models such as described with reference to the AI models 110, 112 of FIG. 1, with the first AI model 314 being a higher-complexity model than the second AI model 316 (e.g., the first AI model 314 has more parameters than the second AI model 316 and/or other differences in performance characteristics).

The response model selector 306 includes a response classifier 308 that is configured (e.g., trained) to classify the input query as being associated with one of a predetermined set of response complexity scores (e.g., to label the input query with an appropriate response complexity score). In some examples, the response classifier 308 is a machine-learning (ML)-based or AI-based classification model that is pre-trained using a training set of pairs of queries and response complexity scores (e.g., each pair has one query and one corresponding response complexity score).

The training dataset may be generated by providing each query of the set of training queries (which may be prior queries that have been collected for this purpose) to multiple AI models of differing complexity (including, in some examples, the first AI model 314 and/or the second AI model 316) and providing the queries and resulting responses to an evaluation AI model (not shown). Such training queries may be extracted from logs of prior queries that have been submitted via the chat interface. The evaluation AI model (which may be an LLM or other generative AI model) is configured to evaluate (e.g., determine) the absolute or relative quality of the responses based on various quality metrics to enable comparisons of response quality across the AI models. Such quality metrics may include, for example, the relevance of the response, the coherence of the response, the groundedness of the response (e.g., lack of hallucinations, whether the information used to generate the response can be traced to the information retrieved by tools), the perceived intelligence of the response, and/or other response quality metrics. The evaluation AI model determines, based on the quality metrics, a quality score for each response. The quality scores, in turn, are used to assign a response complexity score to the query. For example, if a higher-complexity AI model generates a response that is determined to have a significantly higher quality score than that of the response generated using a lower-complexity AI model, the input query is assigned a relatively high response complexity score, indicating that the query is likely to need a higher-complexity AI model to generate a high-quality response. Conversely, if the lower-complexity AI model generates a response that is determined to have a similar quality score as that of the response generated using the higher-complexity AI model, the input query is assigned a relatively low response complexity score, indicating that the query may not need a higher-complexity AI model to generate an acceptable response. In this manner, a set of query and response complexity score pairs can be generated and used to train the response classifier 308 such that the response classifier 308 is able to determine a response complexity score for a new input query (e.g., an input query that is not included in the training data).

After the response classifier 308 determines a response complexity score for the input query, the response model selector 104 selects the first AI model 314 or the second AI model 316 for generating a response to the input query by comparing the response complexity score to a threshold score. In some examples, if the response complexity score for the input query exceeds the threshold score, the response model selector 306 selects the first AI model 314 (i.e., the more complex model) for generating a response. Similarly, if the response complexity score for the input query does not exceed the threshold score (e.g., is less than or equal to the threshold score), the response model selector 306 selects the second AI model 316 for generating a response.

In some examples, the threshold score used for selecting the AI model is a constant value. In other examples, the threshold score is dynamically varied based on the current utilization level of the first AI model 314 and/or second AI model 316 to implement a load-balancing feature, as described below.

In some examples, the response model selector 306 includes a load balancer 310. The load balancer 310 is configured to determine a utilization of the first AI model 314 and/or the second AI model 316 and dynamically adjust the threshold score based on the utilization level(s). The utilization of the AI model(s) may be evaluated based on, for example, the number of active graphics processing units (GPUs) associated with the AI model, the response latency of the AI model, and/or based on another utilization metric. For example, if the load balancer 310 determines that the first AI model 314 (e.g., the higher-complexity AI model) is heavily loaded, the load balancer 310 may lower the threshold score such that more queries are directed to the second AI model 316. As another example, if the load balancer 306 determines that the second AI model 316 is heavily loaded and the first AI model 314 is lightly loaded, the load balancer may raise the threshold score such that more queries are directed to the first AI model 314. In some examples, the load balancer 310 adjusts the threshold score such that the first AI model 314 is kept fully or mostly loaded (e.g., only relatively simple input queries are routed to the second AI model 316, if any).

In some examples, the response model selector 306 selects the first AI model 314 or second AI model 316 based on factors other than model utilization (e.g., in addition to or as an alternative to selecting the AI model based on input query complexity). For example, the response model selector 306 may implement "sticky" AI model selection for a conversation thread (e.g., a series of sequential queries related to the same topic) such that subsequent queries in the same conversation are routed to the same AI model independent of (e.g., regardless of) their complexity scores and/or the AI model utilization levels. For example, an input query may be part of a conversation thread that includes a prior (related) input query and the input query. In this case, the response model selector 306 may select the same AI model for generating a response to the input query as the AI model that was used to generate a response to the prior input query in the conversation thread (e.g., based on the prior selection of the AI model). Sticky AI model selection can help to maintain the consistency of responses in a conversation thread and reduce response latencies by enabling the AI model to leverage data that was previously cached as part of responding to the prior input query.

In some examples, the response model selector 306 selects an AI model for generating a response to a query based on a combination of criteria that include the response complexity score of the query (e.g., compared to a threshold score), the utilization of the AI model(s), and/or the AI model selected for previous queries in the conversation. In examples, each of these criteria may be separately weighted and/or selectively ignored. For example, if the load balancer 310 determines that the first model 314 is fully loaded and/or is providing responses with long latencies, the response model selector 306 may select the second AI model 316 to generate a response to a query regardless of the response complexity score of the query.

In the example of FIG. 3, the system includes a prompt generator 312 that is configured to receive the input query (and any associated context, such as prior input queries and/or responses in the conversation thread) and generate, based on the input query and context, a prompt for the first AI model 314 or the second AI model 316 (depending on which AI model is selected). The prompt may include instructions, in the form of static portions, that instruct the selected AI model to generate a response to the input query. The prompt includes a dynamic portion that is populated with the input query and context. The prompt is routed (e.g., transmitted) to the selected AI model (e.g., to the first AI model 314 or the second AI model 316), which may be remotely located.

In some examples, the prompt generator 312 receives an indication of the selected AI model (e.g., from the response model selector 306) and generates a prompt based on the selected AI model (e.g., rather than generating the same prompt regardless of which AI model is selected). For example, the prompt generator 312 may format the prompt based on an application program interface (API) associated with the selected AI model and/or may determine how much and/or what kind of information to include in the prompt. For example, if the prompt generator 312 receives an indication that the second AI model 316 has been selected (where the second AI model 316 is a lower-complexity AI model), the prompt generator 312 may perform additional pre-processing of the input query to generate a first prompt that includes additional information and/or reformatting of the input query to help the second AI model 316 respond to the prompt. In contrast, if the prompt generator 312 receives an indication that the first AI model 314 has been selected (where the first AI model 316 is a higher-complexity AI model) the prompt generator 312 may refrain from pre-processing the input query and may generate a second prompt for the first AI model (e.g., a prompt that is different from the first prompt).

In response to receiving a prompt (e.g., from prompt generator 312), the first AI model 314 and second AI model 316 are each configured to identify relevant tools (if any) that should be used for gathering information, such as grounding data, that will be used by the selected AI model for generating the response. For example, in response to receiving a prompt, the first AI model 314 may identify, based on the prompt, first tool(s) 318 that are relevant to the prompt and generate an appropriate request(s) for information from the tool(s) 318. The first AI model 314 may transmit the request(s) to the tool(s) 318 and receive the information from the tool(s) 318 in response to the request(s). The first AI model 314 may then generate a response based on the prompt and/or based on the information received from the first tool(s) 318 (if any).

Similarly, in response to receiving a prompt, the second AI model 316 may identify, based on the prompt, second tool(s) 320 that are relevant to the prompt and generate an appropriate request(s) for information from the second tool(s) 320. The second AI model 316 may transmit the request(s) to the second tool(s) 320 and receive the information from the second tool(s) 320 in response to the request(s). The second AI model 316 may then generate a response based on the prompt and/or based on the information received from the second tool(s) 320 (if any).

As shown in FIG. 3, the output of the selected AI model (the response) is provided to the chat interface 302, which surfaces the response in the chat interface 302.

In the example of FIG. 3, the (same) selected AI model (the first AI model 314 or second AI model 316) is used for both the reasoning stage and the responding stage described with reference to FIGS. 1-2. In some examples, however, a system can select different AI models for the reasoning stage and the responding stage, as described with reference to FIGS. 4A-4B.

Figure 4A:
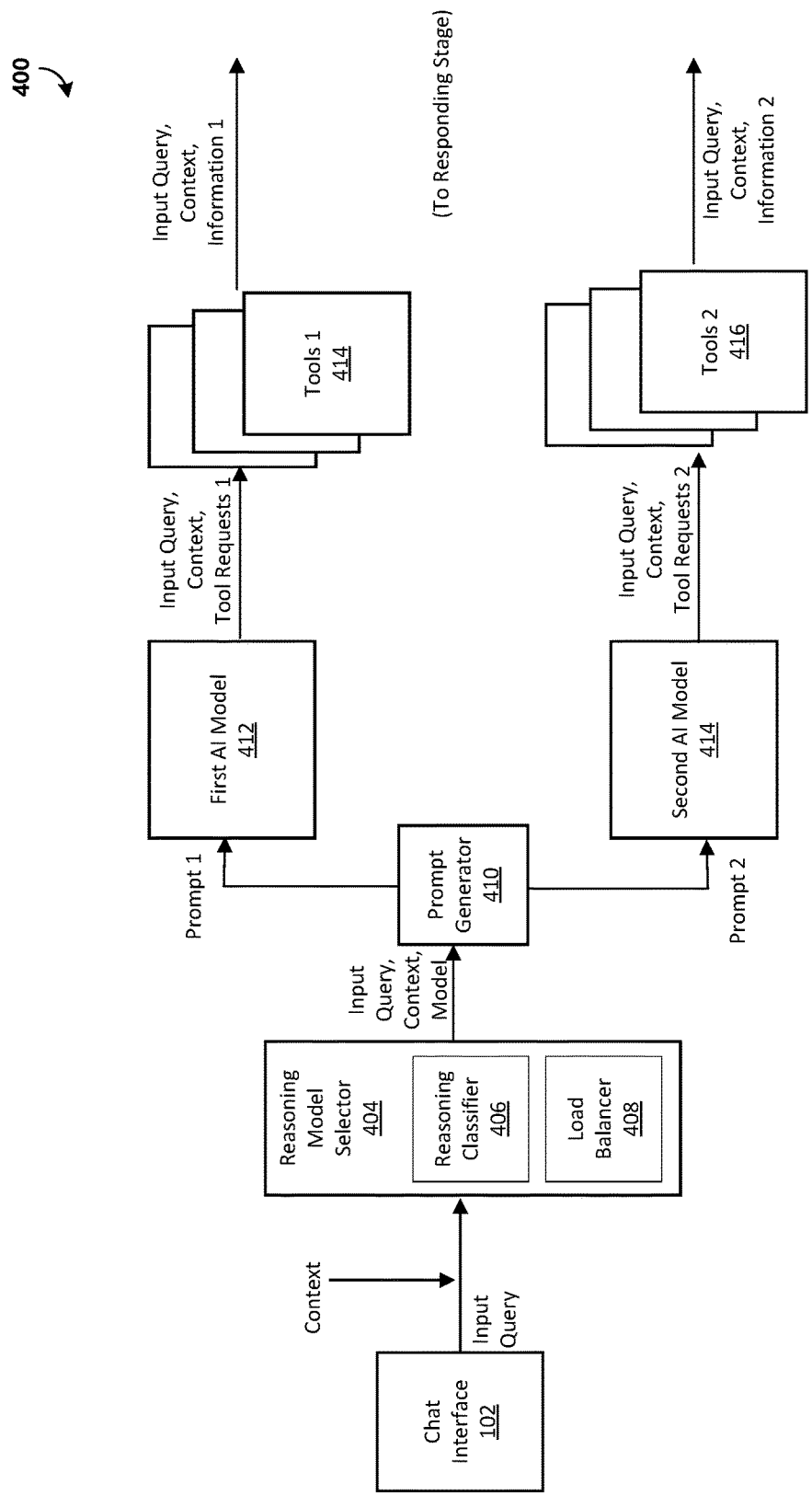
FIG. 4A is a portion of a system for resource conservation based on query complexity according to an example.

FIG. 4A is a block diagram of first portion of a system 400 for resource conservation based on query complexity according to an example. FIG. 4A corresponds to a reasoning stage of the system 400.

System 400 includes the chat interface 102 for receiving input queries and presenting responses. The system 400 also includes a reasoning model selector 404 that is configured to analyze an input query (and any additional relevant context, such as prior input queries in the same conversation and/or prior responses generated in response to prior input queries) to determine a reasoning complexity score associated with the input query. The reasoning model selector 404 then selects, based on the reasoning complexity score, a first AI model 412 or a second AI model 414 for identifying relevant tools (if any) that are needed to obtain information for generating a response to the input query (e.g., in a manner similar to that described with reference to the response model selector of FIG. 3). The first AI model 412 and second AI model 414 are LLM-based models such as described with reference to the AI models 110, 112 of FIG. 1, with the first AI model 412 having different performance characteristics than the second AI model 414. For example, the first AI model 412 is a higher-complexity AI model that has more parameters than the second AI model 414 and/or other differences in performance characteristics. While only two AI models are discussed in the example, in other examples, the system 400 uses a larger number of AI models from which a particular AI model may be selected.

The reasoning model selector 404 includes a reasoning classifier 406 that is configured (e.g., trained) to classify the input query as being associated with a particular reasoning complexity score of a predetermined set of reasoning complexity scores. The reasoning model selector 404 operates in a manner similar to that of the response classifier described with reference to FIG. 3, but in some examples, reasoning model selector 404 is trained on different data and therefore may, for the same input query, produce a different complexity score than is produced by the responding classifier. In particular and as described in more detail below, the reasoning classifier 406 is configured to evaluate the complexity of the input query in terms of how difficult it is likely to be for an AI model to identify relevant tools and obtain information needed to generate a response to the input query (rather than in terms of how difficult it is likely to be to generate the response itself).

In some examples, the reasoning classifier 406 is an ML-based and/or AI-based classification model that is pre-trained using a training set of query and complexity score pairs. The training set may be generated by providing each query of the set of training queries (e.g., prior queries from logs) to multiple AI models of differing complexity (including, in some examples, the first AI model 412 and/or the second AI model 414). The queries and resulting set of identified tools (e.g., the tools identified by the AI model as being relevant to the input query, which may be a null set if the AI model determines that no tools are needed) may then be provided to an evaluation AI model. The evaluation AI model evaluates (e.g., determines) the absolute or relative quality of the set of identified tools based on various quality metrics, such as based on whether the tools that were identified by the AI model match the user's intent and the intended use for the tool. In examples, the evaluation AI model determines, based on the quality metrics, a quality score for each set of identified tools. The quality scores, in turn, are used to assign a reasoning complexity score to the query. For example, if a higher-complexity AI model generates a list of identified tools that is determined to have a significantly higher quality score than that of the list of identified tools generated using a lower-complexity AI model, the input query is assigned a relatively high reasoning complexity score, indicating that it is a query that is likely to need a higher-complexity AI model to accurately identify relevant tools. Conversely, if the lower-complexity AI model generates a list of tools that is determined to have a similar quality score as that of the list of tools generated using the higher-complexity AI model, the input query is assigned a relatively low reasoning complexity score, indicating that the query may not need a higher-complexity AI model to identify relevant tools. In this manner, a set of query and complexity score pairs (where each pair includes on query and a corresponding complexity score) can be generated and used to train the reasoning classifier 406 so that the reasoning classifier 406 is able to determine a reasoning complexity score for a new input query (e.g., an input query that is not included in the training data).

After the reasoning classifier 406 determines the first reasoning complexity score for the input query, the reasoning model selector 404 selects the first AI model 412 or the second AI model 414 for the reasoning stage 402 (e.g., for identifying the relevant tools and generating requests to send to the tools) by comparing the first reasoning complexity score to a first threshold score (which may, in some examples, be dynamically varied by a load balancer 408 based on utilization of the first AI model 412 and/or second AI model 414 in a manner similar to that described with reference FIG. 3). A prompt generator 410 generates, based on the input query, the context (if any), and the selected AI model, an appropriate prompt for the selected AI model as described with reference to FIG. 3. In some examples, the prompt generator 410 is included in the reasoning model selector 404 (e.g., in the reasoning classifier 406).

In response to receiving the prompt from the prompt generator 410, the selected AI model (e.g., the first AI model 412 or second AI model 414) identifies relevant tools (e.g., first tools 414 or second tools 416), and generates and transmits appropriate requests to the identified tools to obtain information from the tools that may be needed (e.g., by an AI model) to generate a response to the input query. The input query, any associated context, and any information obtained during the reasoning stage are subsequently used to generate a response during a responding stage, as discussed with reference to FIG. 4B.

Figure 4B:
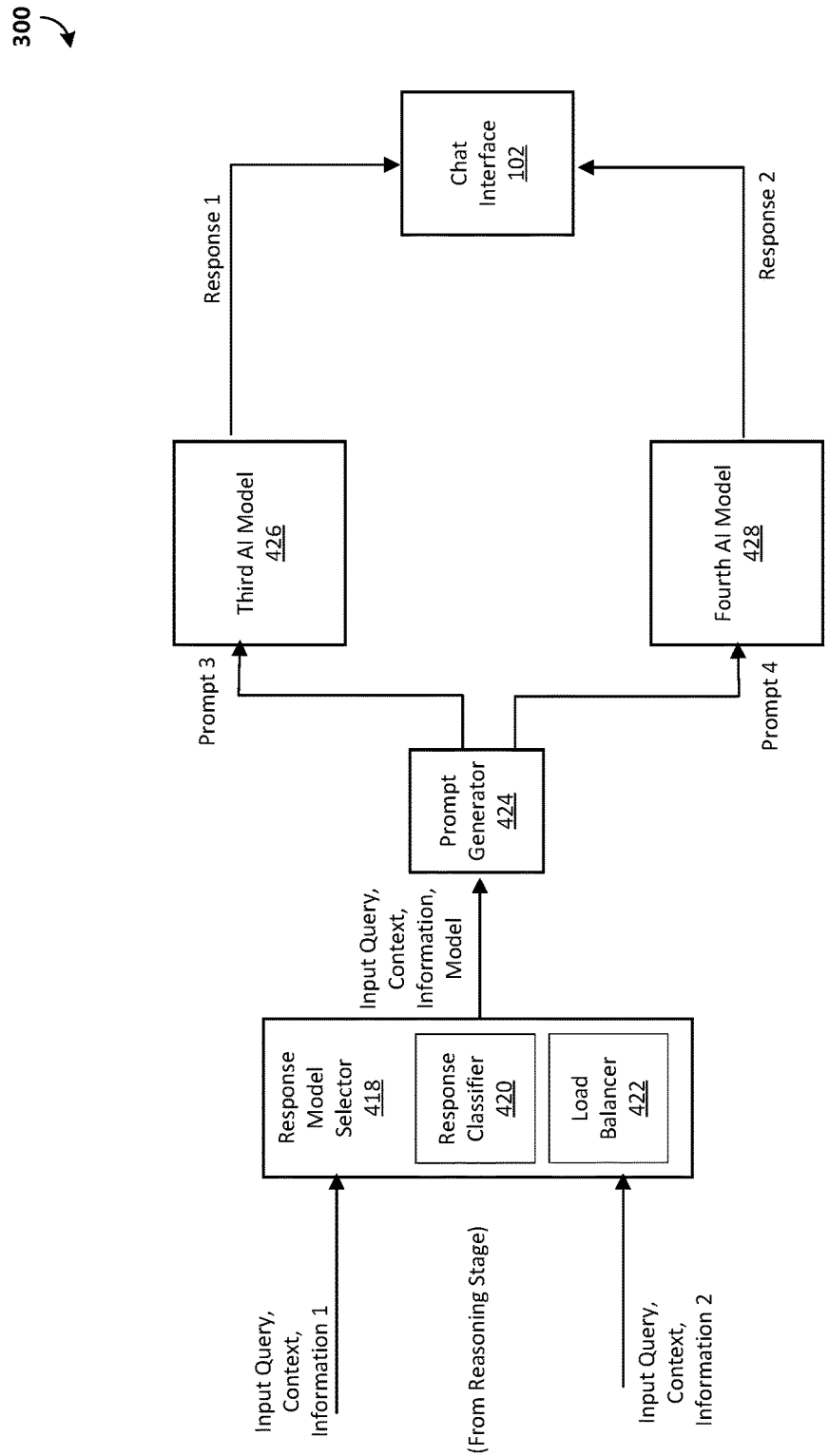
FIG. 4B is a portion of a system for resource conservation based on query complexity according to an example.

FIG. 4B is a block diagram of a second portion of the system 400 for resource conservation based on query complexity according to an example. FIG. 4B corresponds to a responding stage of the system 400.

The system 400 includes a response model selector 418 that includes a response classifier 420 and a second load balancer 422, each of which are examples of the response model selector 306, response classifier 308, and the first load balancer 310 (respectively) discussed with reference to FIG. 3. The response model selector 418 receives the input query and context (if any) along with the information obtained by either the first AI model 412 or second AI model 414 (depending on which AI model was selected during the reasoning stage in FIG. 4A). The response classifier 420 classifies the input query with a response complexity score and the response model selector 418 selects either a third AI model 426 or a fourth AI model 428 for generating a response to the input query based on whether the response complexity score exceeds a second threshold score (e.g., in a manner similar to that described with reference to FIG. 3). In some examples, the third first AI model 426 is different from the first AI model 412 and/or the fourth AI model 428 is different from the second AI model 414. In other examples, the third AI model 426 is the same as the first AI model 412 and/or the fourth AI model 428 is the same as the second AI model 414. In some examples, the response complexity score is different from the reasoning complexity score (e.g., the same input query is classified with different complexity scores during the reasoning stage and responding stage).

In some examples, the second threshold score is a constant value. In some examples, the second threshold score is dynamically varied by the second load balancer 422 based on the utilization of the third AI model 426, the utilization of the fourth AI model 428, or both, such as described with reference to FIG. 3. In some examples, the second threshold score is different from the first threshold score.

The system 400 includes a second prompt generator 424, which may be the same as or different from the first prompt generator 410. The second prompt generator 424 generates a prompt for the third AI model 426 or a prompt for the fourth AI model 428, depending on which model was selected by the response model selector 418. In some examples, the second prompt generator 424 receives an indication of a selected AI model from the response model selector 418 and generates the second prompt based on the indication of the selected AI model. The generated prompt is provided as an input to the selected AI model (the third AI model 426 or fourth AI model 428). The response to the input query is received from the selected AI model as an output, provided to the chat interface 102 for surfacing to the user.

Figure 5:
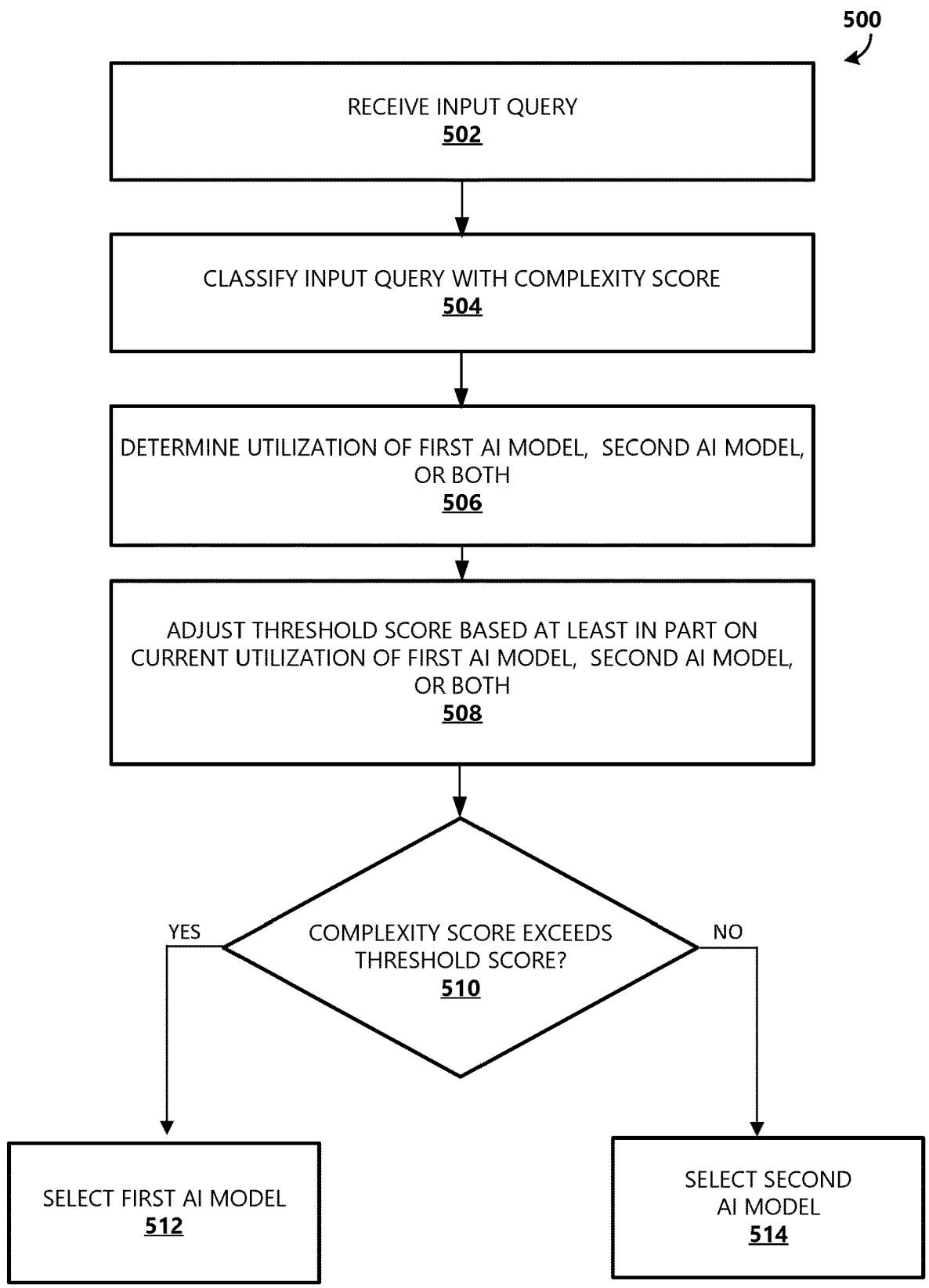
FIG. 5 depicts an example method of selecting an AI model based on a query complexity.

FIG. 5 depicts an example method 500 of resource conservation based on query complexity. Method 500 represents an example in which a system (e.g., system 300, 400) uses dynamic load balancing (e.g., in addition to query complexity) for AI model selection. Method 500 is performed by a model selector (such as reasoning model selector 404) and/or a response model selector (such as response model selector 306, 418).

At operation 502, the model selector receives an input query. For example, the model selector receives the input query via a chat interface such as chat interface 102. In some examples, the input query is in the form of a natural-language query, such as a natural-language text string.

At operation 504, the model selector classifies the input query with a complexity score. For example, a reasoning classifier of a reasoning model selector classifies the input query with a reasoning complexity score (such as described with reference to FIG. 4A) and/or a response classifier of a response model selector classifies the input query with a response complexity score (such as described with reference to FIGS. 3 and 4B).

At operation 506, the model selector determines a utilization of a first AI model of a set of two or more AI models, a utilization of a second AI model of the set of two or more AI models, or both. For example, a load balancer of a reasoning model selector and/or a load balancer of a response model selector determines the utilization of the first AI model and/or second AI model based on a measured latency associated with the AI model (e.g., a latency of a response received from the AI model), a GPU utilization percentage, an available bandwidth associated with communicating with the AI model, and/or based on other utilization metrics.

At operation 508, the model selector determines (e.g., selects, calculates, adjusts) a threshold score based at least in part on the utilization of a first AI model, the utilization of a second AI model, or both. For example, a load balancer of the model selector determines the threshold score based on the utilization of the first AI model, second AI model, or both. In some examples, the load balancer determines whether a utilization of the first AI model exceeds a threshold utilization. In accordance with a determination that the utilization of the first AI model exceeds the threshold utilization, the load balancer sets the threshold score to a first value. In accordance with a determination that the utilization of the first AI model does not exceed the threshold utilization, the load balancer sets the threshold score to a second value. For example, if the first AI model is a high-complexity model, the load balancer may set the threshold score to a lower value when the utilization of the high-complexity model exceeds the threshold utilization so that more input queries are directed to the second AI model (e.g., a lower-complexity AI model), or vice versa.

At operation 510, the model selector determines whether the complexity score of the input query exceeds the threshold score determined or adjusted at operation 508.

In accordance with a determination that the complexity score exceeds the threshold score, at operation 512, the model selector selects the first AI model (i.e., the more complex model). In this case, a prompt generator (e.g., prompt generator 312, 410, 424) generates and transmits a prompt to the first AI model, where the prompt includes the input query. As discussed further herein, the prompt may be generated from a prompt template that is specific to the first AI model rather than the second AI model.

In accordance with a determination that the complexity score does not exceed the threshold score, at operation 514, the model selector selects the second AI model. In this case, a prompt generator (e.g., prompt generator 312, 410, 424) generates and transmits a prompt to the second AI model, where the prompt includes the input query. As discussed further herein, the prompt may be generated from a prompt template that is specific to the second AI model rather than the first AI model.

Figure 6A:
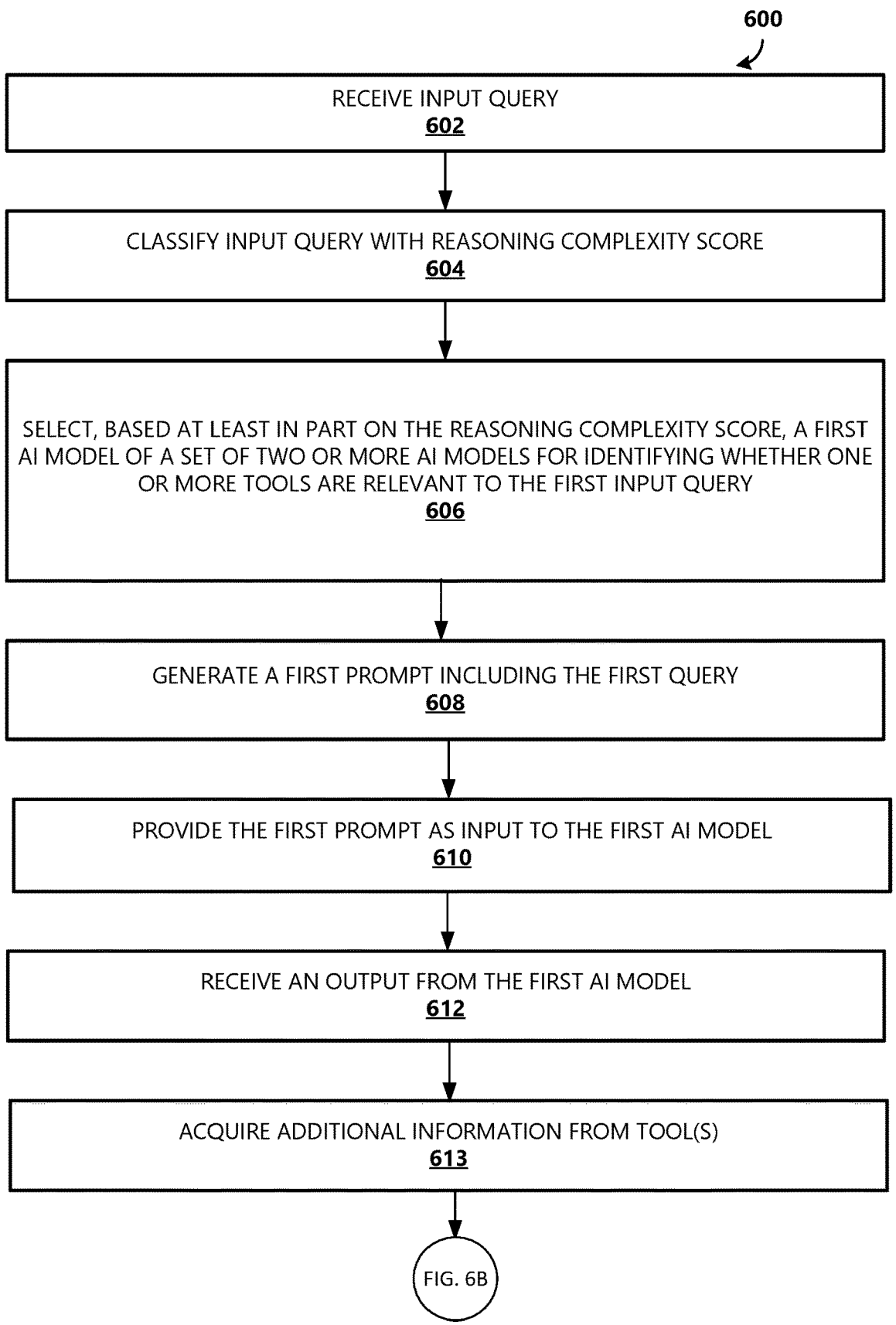
FIGS. 6A-6B depict an example method of selecting an AI model based on a query complexity.
Figure 6B:
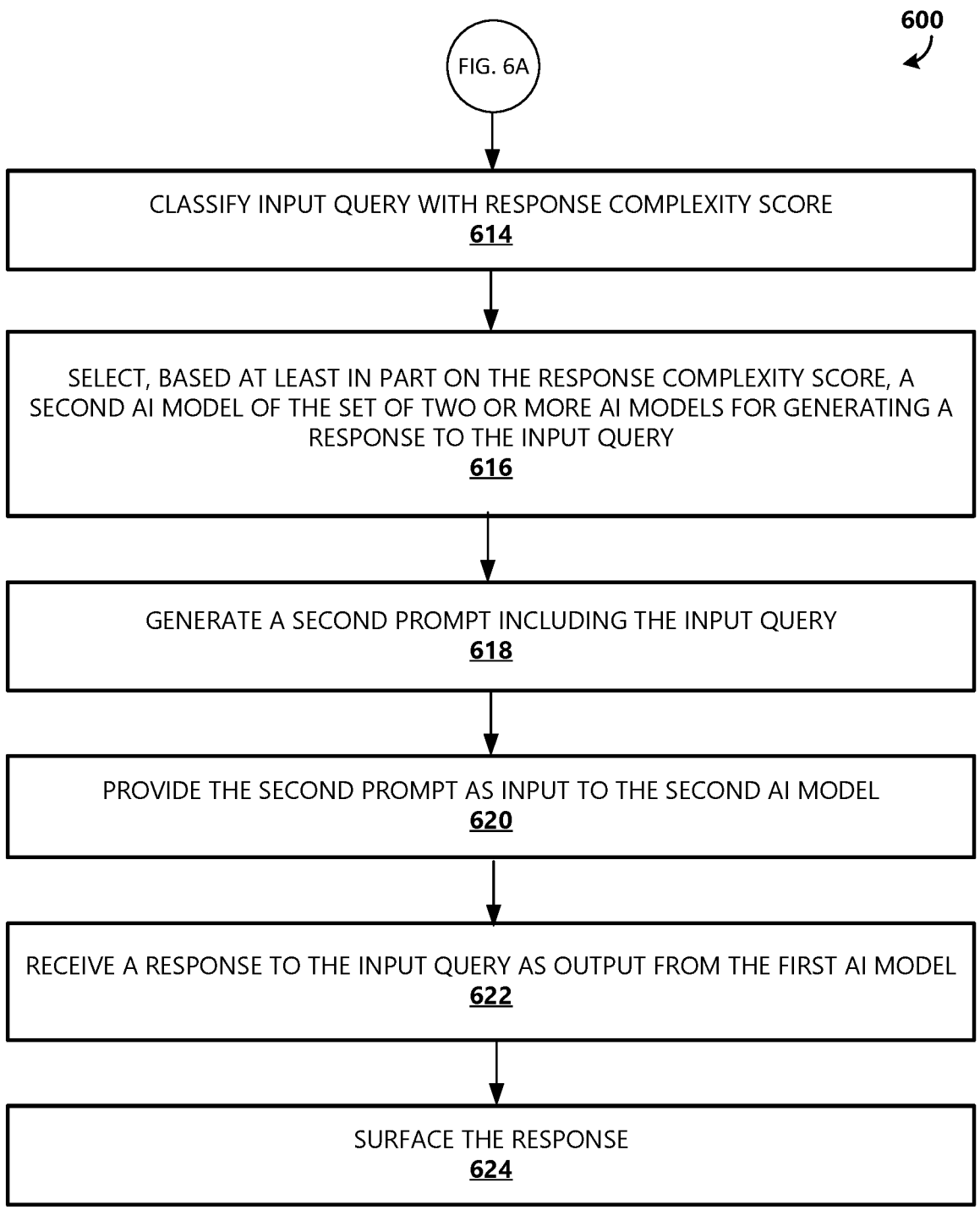

FIGS. 6A-6B depict an example method 600 of AI-model selection based on query complexity. Method 600 is performed by a system that includes various components depicted in FIGS. 3, 4A, and 4B, such as a chat interface (e.g., chat interface 102), a reasoning model selector (e.g., reasoning model selector 408), a response model selector (e.g., response model selector 306, 418), and/or a prompt generator (e.g., prompt generator 312, 410, 424).

At operation 602, the system receives an input query. For example, the system receives the input query via a chat interface such as chat interface 102. In some examples, the input query is in the form of a natural-language query, such as a natural-language text string. In some examples, the input query may also include non-text input, such as audio input and/or image input.

At operation 604, the system classifies the input query with a reasoning complexity score. For example, a reasoning classifier of a reasoning model selector classifies the input query with the reasoning complexity score as described with reference to FIG. 4A.

At operation 606, the system selects, based at least in part on the reasoning complexity score, a first AI model of a set of two or more AI models for identifying whether one or more tools are relevant to the first input query, where each AI model of the set of two or more AI models has different performance characteristics. In some examples, the first AI model is a higher-complexity AI model and the system selects the first AI model in accordance with a determination that the reasoning complexity score exceeds a first threshold score. In other examples, the first AI model is a lower-complexity AI model and the system selects the first AI model in accordance with a determination that the reasoning complexity score does not exceed the first threshold score. The first threshold score may be constant value. In other examples, the first threshold score is dynamically varied based on utilization of the first AI model and/or the utilization of one or more other AI models of the set of two or more AI models, such as described with reference to FIG. 5.

At operation 608, the system generates a first prompt that includes the first query (and additional context in some examples). The system may generate the first prompt based on selecting the first AI model (e.g., the prompt is generated based on characteristics of the first AI model). For example, generating the first prompt may include selecting a first prompt template, from a set or plurality of prompt templates, that is particularly configured for the first AI model. The first prompt template may include static instructions that that are based on the the first AI model (e.g., on the complexity of the first AI model, the type of first AI model, and/or on an API associated with the first AI model). For instance, the static instructions may include fewer or greater number of instructions or examples based on the AI model. In some examples, the first prompt template may be configured with a particular length (e.g., token) limitation based on a length limitation of the first AI model. Generating the first prompt then includes populating the first prompt template with the input query and context data, where available. For instance, the prompt template includes static instructions and dynamic placeholders. The dynamic placeholders are then populated with the input query and context data.

At operation 610, the system provides the first prompt as an input to the first AI model, such as by transmitting the first prompt to the first AI model (e.g., to a device or server on which the first AI model is executed). The first AI model then processes the first prompt.

At operation 612, the system receives an output from the first AI model. The output from the first AI model may include one or more tools that are to be implemented or executed to generate additional information that would be useful or necessary in generating a response to the input query. For instance, tools may be identified that can generate grounding data for answering or responding to the input query. The output from the first AI model may also include an input for the tool, such as a search query for the tool to process to generate the information and/or grounding data. If the first AI model does not identify any tools in response to receiving the first prompt (e.g., if the first AI model determines that no tools are needed to gather information for generating a response) the output from the first AI model may include an indication that no tools have been identified (e.g., a null response).

At operation 613, the additional information is acquired from the one or more tools identified in the output from the first AI model. For instance, the system executes (e.g., launches and/or provides a query or request(s) to) the tool(s) using data provided in the output from the first AI model) to cause the tool(s) to retrieve information that may be subsequently used to generate a response. As an example, the identified tool may be a web search tool, and a search query for the web search tool may be received as output from the first AI model. In such examples, operation 613 includes executing the web search tool with the search query to generate additional information, such as web pages. The additional information may be further processed in some examples to extract subsets of the data as grounding data to be included in a prompt with the initial input query. In other examples, no tools are identified and no additional information is generated. In such examples, operation 613 may be omitted.

At operation 614, the system classifies the input query with a response complexity score. In some examples, the classification is performed for the combination of the initial input query and the additional information or grounding data received in operation 613. For example, a response classifier of a response model selector classifies the input query, and additional information or grounding data where available, to generate the response complexity score. In some examples, the response complexity score may be generated as described above with reference to FIG. 3 and/or FIG. 4B. In some examples, the response complexity score is different from the reasoning complexity score.

At operation 616, the system selects, based at least in part on the response complexity score, a second AI model of the set of two or more AI models for generating a response to the input query. In some examples, the second AI model is a higher-complexity AI model and the system selects the second AI model in accordance with a determination that the response complexity score exceeds a second threshold score. In some examples, the second AI model is a lower-complexity AI model and the system selects the second AI model in accordance with a determination that the response complexity score does not exceed the second threshold score. In some examples, the second threshold score is a constant value. In some examples, the second threshold score is dynamically varied based on utilization of the second AI model and/or utilization of one or more other AI models of the set of two or more AI models, such as described with reference to FIG. 5. In some examples, the second threshold score is different from the first threshold score. In some examples, the second AI model is the same as the first AI model. In some examples, the second AI model is different from the first AI model.

At operation 618, the system generates a second prompt that includes the input query. In some examples, the system generates the second prompt based on selecting the second AI model (e.g., the prompt is generated based on characteristics of the second AI model). The second prompt also includes the additional information, such as grounding data, generated in operation 613.

The second prompt may be generated in a manner similar to the first prompt discussed above regarding operation 608. For example, generating the second prompt may include selecting a second prompt template, from a set or plurality of prompt templates, that is particularly configured for the second AI model. The second prompt template may include static instructions that that are based on the second AI model (e.g., on the complexity of the second AI model, the type of second AI model, and/or on an API associated with the second AI model). For instance, the static instructions may include fewer or greater number of instructions or examples based on the AI model. In some examples, the second prompt template may be configured with a particular length (e.g., token) limitation based on a length limitation of the second AI model. Generating the second prompt then includes populating the second prompt template with the input query, context data, and/or additional information (e.g., grounding data) where available. For instance, the second prompt template includes static instructions and dynamic placeholders. The dynamic placeholders are then populated with the input query, the context data, and/or the additional information (e.g., grounding data).

At operation 620, the system provides the second prompt as an input to the second AI model, such as by transmitting the second prompt to the second AI model (e.g., to a device or server on which the second AI model is hosted or executed).

At operation 622, the system receives a response to the input query as an output from the second AI model. In some examples, the response to the input query is in the form of a natural language response, an image, and/or another type of response.

At operation 624, the system surfaces the response. For example, the response is presented using a chat interface, such as by displaying or playing the response within the chat interface.

In some examples, the operations presented in FIG. 6A may be performed without performing some or all of the operations in FIG. 6B. For example, a system may use a reasoning model selector to select an AI model for a reasoning stage without using a response model selector to select an AI model for a responding stage (e.g., by using the same AI model to generate a response without regard for the complexity of the input query). Conversely, the operations presented in FIG. 6B may be performed without performing some or all of the operations in FIG. 6A. For example, a system may use a response model selector to select an AI model for a responding stage without using a reasoning model selector to select an AI model for a reasoning stage (e.g., by using the same AI model for reasoning without regard for the complexity of the input query).

FIG. 7 is a block diagram illustrating physical components (e.g., hardware) of a computing device 700 with which examples of the present disclosure may be practiced. The computing device components described below may be suitable for one or more of the components of the systems described above. In a basic configuration, the computing device 700 includes at least one processing unit 702 and a system memory 704. Depending on the configuration and type of computing device 700, the system memory 704 may comprise volatile storage (e.g., random access memory), non-volatile storage (e.g., read-only memory), flash memory, or any combination of such memories. The system memory 704 may include an operating system 705 and one or more program modules 706 suitable for running software applications 750 (e.g., a chat interface, one or more model selectors (e.g., a reasoning model selector and/or a response model selector), one or more prompt generators, and/or one or more AI models) and/or other applications.

The operating system 705 may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, or optical disks. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including one or more of the stages of the methods 200, 500, and/or 600, illustrated in FIGS. 2, 5, 6A, and 6B. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to detecting an unstable resource may be operated via application-specific logic integrated with other components of the computing device 700 on the single integrated circuit (chip). Examples of the present disclosure may also be practiced using other technologies capable of performing logical operations such as, for example, AND, OR, and NOT, including mechanical, optical, fluidic, and quantum technologies.

The computing device 700 may also have one or more input device(s) 712 such as a keyboard, a mouse, a pen, a sound input device, a touch input device, a camera, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 704, the removable storage device 709, and the non-removable storage device 710 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer readable media may be part of the computing device 700. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, the technology relates to a system for artificial intelligence (AI) model selection based on query complexity. The system includes at least one processor; and memory storing instructions that, when executed by the at least one processor, cause the system to perform operations. The operations include receiving a first input query; classifying, by a response classifier, the first input query with a first response complexity score; selecting, based at least in part on the first response complexity score, a first AI model of a set of two or more AI models for generating a response to the first input query, wherein each AI model of the set of two or more AI models has different performance characteristics; generating a first prompt including the first input query; providing the first prompt as input to the first AI model; receiving a first response as output from the first AI model; and surfacing the first response.

In an example, the operations further include receiving a second input query; classifying, by the response classifier, the second input query with a second response complexity score; selecting, based at least in part on the second response complexity score, a second AI model of the set of two or more AI models for generating a response to the second input query; generating a second prompt including the second input query; providing the second prompt as input to the second AI model; receiving a second response as output from the second AI model; and surfacing the second response. In another example, the response classifier is a machine-learning classifier model trained on query and complexity score pairs. In still another example, selecting the first AI model based at least in part on the first response complexity score includes: determining that the first response complexity score exceeds a first threshold score, and selecting the first AI model based on the determination that the first response complexity score exceeds the first threshold score. In a further example, the operations further include determining the first threshold score based at least in part on a utilization of the first AI model, a utilization of a second AI model of the set of two or more AI models, or both. In yet another example, the first input query is part of a conversation thread comprising a prior input query and the first input query, and the first AI model is selected based at least in part on a prior selection of the first AI model for generating a response to the prior input query. In still yet another example, the first prompt is generated based on the first AI model.

In another aspect, the technology relates to a system for artificial intelligence (AI) model selection based on query complexity. The system includes at least one processor; and memory storing instructions that, when executed by the at least one processor, cause the system to perform operations. The operations include receiving a first input query; classifying, by a reasoning classifier, the first input query with a first reasoning complexity score; selecting, based at least in part on the first reasoning complexity score, a first AI model of a set of two or more AI models for identifying whether one or more tools are relevant to the first input query, wherein each AI model of the set of two or more AI models has different performance characteristics; generating a first prompt including the first input query; providing the first prompt as input to the first AI model; receiving an output from the first AI model identifying one or more tools relevant to the first input query; classifying, by a responding classifier, the first input query with a first response complexity score; selecting, based at least in part on the first response complexity score, a second AI model of the set of two or more AI models for generating a response to the first input query; generating a second prompt including the first input query; providing the second prompt as input to the second AI model; receiving a first response to the first input query as output from the first AI model; and surfacing the first response.

In an example, the response classifier is a first machine-learning classifier model trained on prior query and response complexity score pairs, and the reasoning classifier is a second machine-learning classifier model trained on prior query and reasoning complexity score pairs. In another example, the first reasoning complexity score is different from the first response complexity score. In still another example, receiving the output from the first AI model includes receiving an indication of one or more tools to execute to generate additional information, and the second prompt includes at least a portion of the additional information. In a further example, generating the second prompt includes selecting the at least the portion of the additional information to include in the second prompt based on selecting the first AI model. In still another example, the operations further comprise, based on the output from the first AI model, executing one or more tools to generate grounding data; and wherein the responding classifier classifies the first input query in combination with the grounding data to generate the first response complexity score. In yet another example, selecting the first AI model based at least in part on the first reasoning complexity score includes determining that the first reasoning complexity score exceeds a first threshold score, and selecting the first AI model based on the determination that the first reasoning complexity score exceeds the first threshold score. In still yet another example, selecting the second AI model based at least in part on the first response complexity score includes determining that the first response complexity score exceeds a second threshold score, and selecting the second AI model based on the determination that the first response complexity score exceeds the second threshold score.

In another example, the operations further include receiving a second input query; classifying, by the reasoning classifier, the second input query with a second reasoning complexity score; selecting, based at least in part on the second reasoning complexity score, a third AI model of the set of two or more AI models for identifying whether one or more tools are relevant to the first input query; generating a third prompt including the second input query; providing the third prompt as input to the third AI model; receiving an output from the third AI model; classifying, by the response classifier, the second input query with a second response complexity score; selecting, based at least in part on the second response complexity score, a fourth AI model of the set of two or more AI models for generating a response to the second input query; generating a fourth prompt including the second input query; providing the fourth prompt as input to the fourth AI model; receiving a second response as output from the fourth AI model; and surfacing the second response. In a further example, the third AI model is different from the first AI model, the fourth AI model is different from the second AI model, or both.

In another aspect, the technology relates to a computer-implemented method for artificial intelligence (AI) model selection based on query complexity. The method includes receiving a first input query; classifying, by a response classifier, the first input query with a first response complexity score; selecting, based at least in part on the first response complexity score, a first AI model of a set of two or more AI models for generating a response to the first input query, wherein each AI model of the set of two or more AI models has different performance characteristics; generating a first prompt including the first query; providing the first prompt as input to the first AI model; receiving a first response as output from the first AI model; and surfacing the first response.

In an example, the method further includes receiving a second input query; classifying, by the response classifier, the second input query with a second response complexity score; selecting, based at least in part on the second response complexity score, a second AI model of the set of two or more AI models for generating a response to the second input query; generating a second prompt including the second input query; providing the second prompt as input to the second AI model; receiving a second response as output from the second AI model; and surfacing the second response. In another example, the response classifier is a machine-learning classifier model trained on prior query and response complexity score pairs, and classifying the first input query with a first response complexity score comprises providing the first input query as an input to the model and receiving the first response complexity score as an output from the model.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an erasable programmable read-only memory (EPROM), non-volatile random-access memory (NVRAM), phase-change random-access memory (PRAM), or other such media, or networked versions of such media. Volatile media include, for example, dynamic memory such as dynamic random-access memory (DRAM), static random-access memory (SRAM), a cache, or other such media. Non-transitory media is distinct from, but can be used in conjunction with, transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for artificial intelligence (AI) model selection based on query complexity, comprising:
    at least one processor; and
    memory storing instructions that, when executed by the at least one processor, cause the system to perform operations comprising:
        receiving a first input query;
        classifying, by a response classifier, the first input query with a first response complexity score;
        comparing the first response complexity score to a threshold score;
        selecting, based at least in part on the comparison of the first response complexity score to the threshold score, a first AI model of a set of two or more AI models for generating a response to the first input query, wherein each AI model of the set of two or more AI models has different performance characteristics;
        generating a first prompt including the first input query;
        providing the first prompt as input to the first AI model;
        receiving a first response as output from the first AI model; and
        surfacing the first response.

2. The system of claim 1, wherein the operations further comprise:
    receiving a second input query;
    classifying, by the response classifier, the second input query with a second response complexity score;
    selecting, based at least in part on the second response complexity score, a second AI model of the set of two or more AI models for generating a response to the second input query;
    generating a second prompt including the second input query;
    providing the second prompt as input to the second AI model;
    receiving a second response as output from the second AI model; and
    surfacing the second response.

3. The system of claim 1, wherein the response classifier is a machine-learning classifier model trained on query and complexity score pairs.

4. The system of claim 1, wherein the operations further comprise:
    determining the first threshold score based at least in part on a utilization of the first AI model, a utilization of a second AI model of the set of two or more AI models, or both.

5. The system of claim 1, wherein the first input query is part of a conversation thread comprising a prior input query and the first input query, and the first AI model is selected based at least in part on a prior selection of the first AI model for generating a response to the prior input query.

6. The system of claim 1, wherein the first prompt is generated based on the first AI model.

7. The system of claim 3, wherein the on query and complexity score pairs comprise:
    prior queries extracted from one or more logs; and
    prior complexity scores for the prior queries, wherein the prior complexity scores were generated by:
        executing the prior queries with a plurality of different AI models to generate a plurality of responses; and
        generating complexity scores for the prior queries by evaluating the responses with an evaluation AI model.

8. A system for artificial intelligence (AI) model selection based on query complexity, comprising:
    at least one processor; and
    memory storing instructions that, when executed by the at least one processor, cause the system to perform operations comprising:
        receiving a first input query;
        classifying, by a reasoning classifier, the first input query with a first reasoning complexity score;
        selecting, based at least in part on the first reasoning complexity score, a first AI model of a set of two or more AI models for identifying whether one or more tools are relevant to the first input query, wherein each AI model of the set of two or more AI models has different performance characteristics;
        generating a first prompt including the first input query;
        providing the first prompt as input to the first AI model;
        receiving an output from the first AI model identifying one or more tools relevant to the first input query;
        classifying, by a responding classifier, the first input query with a first response complexity score;
        selecting, based at least in part on the first response complexity score, a second AI model of the set of two or more AI models for generating a response to the first input query;
        generating a second prompt including the first input query;
        providing the second prompt as input to the second AI model;

receiving a first response to the first input query as output from the first AI model; and
surfacing the first response.

9. The system of claim 8, wherein the response classifier is a first machine-learning classifier model trained on prior query and response complexity score pairs, and the reasoning classifier is a second machine-learning classifier model trained on prior query and reasoning complexity score pairs.

10. The system of claim 8, wherein the first reasoning complexity score is different from the first response complexity score.

11. The system of claim 8, wherein receiving the output from the first AI model includes receiving an indication of one or more tools to execute to generate additional information, and the second prompt includes at least a portion of the additional information.

12. The system of claim 11, wherein generating the second prompt includes selecting the at least the portion of the additional information to include in the second prompt based on selecting the first AI model.

13. The system of claim 8, wherein the operations further comprise:
based on the output from the first AI model, executing one or more tools to generate grounding data; and
wherein the responding classifier classifies the first input query in combination with the grounding data to generate the first response complexity score.

14. The system of claim 8, wherein selecting the first AI model based at least in part on the first reasoning complexity score comprises:
determining that the first reasoning complexity score exceeds a first threshold score, and
selecting the first AI model based on the determination that the first reasoning complexity score exceeds the first threshold score.

15. The system of claim 8, wherein selecting the second AI model based at least in part on the first response complexity score comprises:
determining that the first response complexity score exceeds a second threshold score, and
selecting the second AI model based on the determination that the first response complexity score exceeds the second threshold score.

16. The system of claim 8, wherein the operations further comprise:
receiving a second input query;
classifying, by the reasoning classifier, the second input query with a second reasoning complexity score;
selecting, based at least in part on the second reasoning complexity score, a third AI model of the set of two or more AI models for identifying whether one or more tools are relevant to the first input query;
generating a third prompt including the second input query;
providing the third prompt as input to the third AI model;
receiving an output from the third AI model;
classifying, by the response classifier, the second input query with a second response complexity score;
selecting, based at least in part on the second response complexity score, a fourth AI model of the set of two or more AI models for generating a response to the second input query;
generating a fourth prompt including the second input query;
providing the fourth prompt as input to the fourth AI model;
receiving a second response as output from the fourth AI model; and
surfacing the second response.

17. The system of claim 16, wherein the third AI model is different from the first AI model, the fourth AI model is different from the second AI model, or both.

18. A computer-implemented method for artificial intelligence (AI) model selection based on query complexity, the method comprising:
receiving a first input query;
classifying, by a response classifier, the first input query with a first response complexity score;
comparing the first response complexity score to a threshold score;
selecting, based at least in part on the comparison of the first response complexity score to the threshold score, a first AI model of a set of two or more AI models for generating a response to the first input query, wherein each AI model of the set of two or more AI models has different performance characteristics;
generating a first prompt including the first query;
providing the first prompt as input to the first AI model;
receiving a first response as output from the first AI model; and
surfacing the first response.

19. The computer-implemented method of claim 18, further comprising:
receiving a second input query;
classifying, by the response classifier, the second input query with a second response complexity score;
selecting, based at least in part on the second response complexity score, a second AI model of the set of two or more AI models for generating a response to the second input query;
generating a second prompt including the second input query;
providing the second prompt as input to the second AI model;
receiving a second response as output from the second AI model; and
surfacing the second response.

20. The computer-implemented method of claim 18, wherein the response classifier is a machine-learning classifier model trained on prior query and response complexity score pairs, and classifying the first input query with a first response complexity score comprises providing the first input query as an input to the machine-learning classifier model and receiving the first response complexity score as an output from the machine-learning classifier model.

* * * * *